(12) United States Patent
Barina et al.

(10) Patent No.: US 9,310,859 B2
(45) Date of Patent: Apr. 12, 2016

(54) LIQUID COOLING OF MULTIPLE COMPONENTS ON A CIRCUIT BOARD

(71) Applicant: International Business Machines Corporation, Armonk, NY (US)

(72) Inventors: Richard M. Barina, Sebring, FL (US); Derek I. Schmidt, Raleigh, NC (US); Mark E. Steinke, Durham, NC (US); James S. Womble, Hillsborough, NC (US)

(73) Assignee: International Business Machines Corporation, Armonk, NY (US)

( * ) Notice: Subject to any disclaimer, the term of this patent is extended or adjusted under 35 U.S.C. 154(b) by 200 days.

(21) Appl. No.: 14/077,372

(22) Filed: Nov. 12, 2013

(65) Prior Publication Data

US 2015/0131223 A1    May 14, 2015

(51) Int. Cl.
G06F 1/20 (2006.01)
(52) U.S. Cl.
CPC .......................................... G06F 1/20 (2013.01)
(58) Field of Classification Search
USPC .................................................. 361/679.47
See application file for complete search history.

(56) References Cited

U.S. PATENT DOCUMENTS

| | | | |
|---|---|---|---|
| 5,901,039 A | 5/1999 | Dehaine et al. | |
| 7,120,027 B2 | 10/2006 | Yatskov et al. | |
| 7,414,844 B2 * | 8/2008 | Wilson et al. | 361/699 |
| 7,796,390 B1 | 9/2010 | Cao et al. | |
| 7,830,664 B2 | 11/2010 | Campbell et al. | |
| 7,903,411 B2 | 3/2011 | Campbell et al. | |
| 8,107,234 B2 | 1/2012 | Brunschwiler et al. | |
| 8,109,321 B2 | 2/2012 | Alousi et al. | |
| 8,432,695 B2 | 4/2013 | Yoshikawa | |
| 2006/0060328 A1 * | 3/2006 | Ewes et al. | 165/80.2 |
| 2008/0026509 A1 | 1/2008 | Campbell et al. | |
| 2010/0296239 A1 | 11/2010 | Alyaser et al. | |
| 2012/0085520 A1 | 4/2012 | Pfaffinger | |

OTHER PUBLICATIONS

Altera, "Thermal Solutions to Address Height Variation in Stratix V Packages", AN-670-1.0 Application Note, Oct. 2012 Altera Corporation, pp. 1-4.

* cited by examiner

*Primary Examiner* — Tuan T Dinh
*Assistant Examiner* — Mukund G Patel
(74) *Attorney, Agent, or Firm* — Jeffrey L. Streets

(57) ABSTRACT

An apparatus includes a primary cold plate, a secondary cold plate, and spring biased retainers moveably securing the primary cold plate to the secondary cold plate. The secondary cold plate is securable to a circuit board for thermal engagement with heat-generating components on the circuit board. The primary cold plate is aligned for thermal engagement with a processor on the circuit board and includes an internal liquid cooling channel. The apparatus further comprises compressible thermal interface material disposed between the primary cold plate and the secondary cold plate to conduct heat from the secondary cold plate to the primary cold plate and remove the heat in a liquid flowing through the liquid cooling channel. The apparatus provides thermal engagement and cooling of multiple components having different heights.

11 Claims, 6 Drawing Sheets

LIQUID COOLING OF MULTIPLE COMPONENTS ON A CIRCUIT BOARD

BACKGROUND

1. Field of the Invention

The present invention relates to methods and apparatus for using a circulating liquid to cool heat-generating components on a circuit board.

2. Background of the Related Art

Special expansion cards may be designed in order to accelerate the performance of compute intensive applications. Such special expansion cards may be added to the base compute node to enhance specific types of calculations. For example, NVIDIA makes a special expansion card referred to as a General Purpose Graphics Processing Unit (GPGPU) and INTEL makes a special expansion card referred to as Many Integrated Cores (MIC). In order to generate the highest level of added performance, special expansion cards, such as these just mentioned, consume the maximum allowed power through the PCIe spec, which is 300 watts. This high power state presents a difficult cooling challenge, especially in today's server form factors. When the highly processor intensive systems are water cooled, the resulting lower junction temperatures can lead to less energy consumption due to a decrease in wasteful leakage current. Therefore, the systems can be better managed from a temperature and power consumption perspective.

Unfortunately, simply increasing airflow across a special expansion card is a not a total solution. Adding higher airflow rates comes at the expense of noisier system acoustics, additional physical accommodations for handling the higher air flow volumes, and greater power consumption for the purpose of generating the high airflow rates.

BRIEF SUMMARY

One embodiment of the present invention provides an apparatus, comprising a primary cold plate, a secondary cold plate, and two or more spring biased retainers extending between the primary cold plate and the secondary cold plate and moveably securing the primary cold plate to the secondary cold plate. The secondary cold plate is securable to a circuit board, wherein the secondary cold plate has a first surface aligned for thermal engagement with a plurality of heat-generating components on a surface of the circuit board. The primary cold plate is aligned for thermal engagement with a processor on the circuit board, wherein the primary cold plate includes an internal liquid cooling channel. The two or more spring biased retainers bias the primary cold plate in a direction away from the secondary cold plate while limiting the distance that the primary cold plate can move away from the secondary cold plate, and wherein the primary cold plate may move toward the secondary cold plate under a force overcoming the two or more spring biased retainers. The apparatus further comprises compressible thermal interface material disposed between the primary cold plate and the secondary cold plate to conduct heat from the secondary cold plate to the primary cold plate and remove the heat in a liquid flowing through the liquid cooling channel, wherein the thermal interface material is compressed between the primary cold plate and the secondary cold plate in response to the primary cold plate moving toward the secondary cold plate.

DETAILED DESCRIPTION

Figure 1:
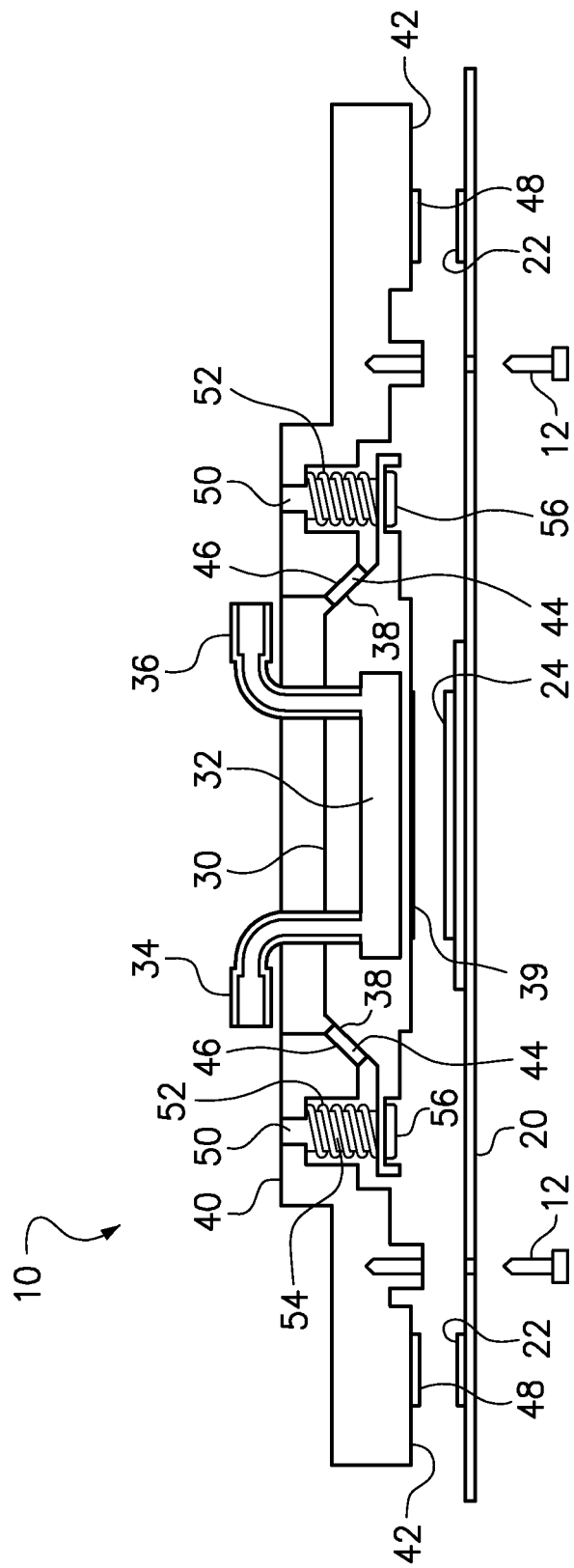
FIG. 1 is a schematic side view of a liquid cooling structure aligned above a planar.

One embodiment of the present invention provides an apparatus, comprising a primary cold plate, a secondary cold plate, and two or more spring biased retainers extending between the primary cold plate and the secondary cold plate and moveably securing the primary cold plate to the secondary cold plate. The secondary cold plate is securable to a circuit board, wherein the secondary cold plate has a first surface aligned for thermal engagement with a plurality of heat-generating components on a surface of the circuit board. The primary cold plate is aligned for thermal engagement with a processor on the circuit board, wherein the primary cold plate includes an internal liquid cooling channel. The two or more spring biased retainers bias the primary cold plate in a direction away from the secondary cold plate while limiting the distance that the primary cold plate can move away from the secondary cold plate, and wherein the primary cold plate may move toward the secondary cold plate under a force overcoming the two or more spring biased retainers. The apparatus further comprises compressible thermal interface material disposed between the primary cold plate and the secondary cold plate to conduct heat from the secondary cold plate to the primary cold plate and remove the heat in a liquid flowing through the liquid cooling channel, wherein the thermal interface material is compressed between the primary cold plate and the secondary cold plate in response to the primary cold plate moving toward the secondary cold plate.

The two or more spring biased retainers preferably define an axial direction and guide the primary cold plate to move in the axial direction. The axial direction is generally perpendicular to the circuit board, when the secondary cold plate has been secured to the circuit board. Most preferably, the primary cold plate and the secondary cold plate may have parallel surfaces that compress the thermal interface material in response to the primary cold plate moving toward the secondary cold plate, wherein the parallel surfaces are angled between 30 and 60 degrees relative to the axial direction. Such a range of angles allows the thermal interface material to be under compression rather than shear, while also allowing for an increased thermal interface surface area to support effective heat transfer there through. In one embodiment, the two or more spring biased retainers include a pre-loaded spring.

In a further embodiment, the apparatus may further comprise a plurality of spacers allowing the secondary cold plate to be secured to the circuit board with the first surface a predetermined spaced distance from the circuit board. A fastener, such as a screw, may be used for the purpose of securing the secondary cold plate to the circuit board. In one option, the plurality of spacers are a feature of the secondary cold plate and extend from the first surface of the secondary cold plate.

For example, the spacers may be integrally formed with the second cold plate, which may be cast using an aluminum alloy.

Still further, the first surface of the secondary cold plate may be divided into a plurality of regions, wherein each region is aligned with one or more of the plurality of heat-generating components on the circuit board. Each region may also have a predetermined spaced distance from the circuit board for thermal engagement with the one or more heat-generating components aligned with each region. Preferably, the predetermined spaced distance of each region may be proportional to a height of the one or more components aligned with each region. In addition, compressible thermal interface material is preferably secured to the first surface in alignment with the plurality of heat-generating components, where the compressible thermal interface material has a thickness that extends from the first surface within each region into thermal engagement with the one or more components aligned with each region. For the purpose of efficiently removing heat from heat-generating components that experience variations in their installed height relative to the circuit board, the thickness of the compressible thermal interface material in each region is preferably greater than variations in the installed height of the one or more components aligned with each region.

In yet another embodiment, the two or more spring biased retainers define an axial direction and guide the primary cold plate to move in the axial direction. The two or more spring biased retainers may limit the travel of the primary cold plate between first and second spaced distances from the circuit board, wherein the processor has an installed height relative to the circuit board that is intermediate of the first and second spaced distances from the circuit board. Accordingly, it is assured that the primary cold plate will be pressed against the processor and provide effective thermal engagement with the processor despite any variation in the installed height of the processor. Furthermore, the spring biased retainers act to self-level the primary cold plate against the processor for a face-to-face thermal engagement. Optionally, a thermal grease may be disposed between the primary cold plate and the processor to further improve the heat transfer from the processor to the primary cold plate.

Embodiments of the invention may provide a custom cooling solution for a particular circuit board or card, such as a motherboard or an expansion card. The apparatus thermally connects heat-generating components on the circuit board with varying height tolerances to a single liquid cooling structure by mechanically decoupling tightly controlled tolerance features (i.e., the processor) from loosely controlled tolerance features (i.e., board-mounted memory and voltage regulation). As a result, the primary cold plate and processor interface may have a very thin bond line (i.e., thermal grease) and a higher force (i.e., spring biased) there between as compared to the secondary cold plate and board-mounted heat-generating component interfaces, which involve a thicker bond line (i.e., compressible thermal interface material) and less force (i.e., the resistance force of the compressible thermal interface material). Still, dividing the secondary cold plate into regions having spaced distances from the circuit board that are designed to be complementary to the height of components on the circuit board, has the benefit of minimizing the bond line thicknesses despite possibly wide variations in component heights. The secondary cold plate is preferably made from an aluminum alloy for its high strength, light weight, and good thermal conductivity.

Another embodiment of the present invention provides a method, comprising: securing a primary cold plate to a secondary cold plate, wherein the primary cold plate is biased in a direction away from the secondary cold plate while limiting the distance that the primary cold plate can move away from the secondary cold plate; aligning the secondary cold plate with a circuit board having a plurality of heat-generating components, wherein the primary cold plate is aligned with a processor on the circuit board; securing the aligned secondary cold plate to the circuit board, wherein the secondary cold plate has a first surface in thermal engagement with the plurality of heat-generating components on the circuit board, and wherein the primary cold plate is pressed against the processor to overcome the bias on the primary cold plate, move the primary cold plate toward the secondary cold plate, position the primary cold plate in thermal engagement with the processor, and compress a thermal interface material between the primary cold plate and the secondary cold plate; and passing a cooling liquid through a liquid cooling channel within the primary cold plate, wherein the primary cold plate draws heat from the processor and from the secondary cold plate.

In a further embodiment of the method, the primary cold plate may be biased with two or more spring biased retainers that define an axial direction and guide the primary cold plate to move in the axial direction. Furthermore, the primary cold plate and the secondary cold plate may have parallel surfaces that compress the thermal interface material in response to the primary cold plate moving toward the secondary cold plate, wherein the parallel surfaces are angled between 30 and 60 degrees relative to the axial direction. Optionally, the two or more spring biased retainers may include a pre-loaded spring.

Securing the secondary cold plate to the circuit board, may include securing a plurality of spacers between the primary cold plate and the secondary cold plate so that the secondary cold plate is secured to the circuit board with a first surface of the secondary cold plate positioned a predetermined spaced distance from the circuit board. The plurality of spacers are preferably a feature of the secondary cold plate and extend from the first surface of the secondary cold plate. In a preferred embodiment, the first surface of the secondary cold plate is divided into a plurality of regions, wherein each region is aligned with one or more of the plurality of heat-generating components and has a predetermined spaced distance from the circuit board for thermal engagement with the one or more heat-generating components aligned with each region. The predetermined spaced distance of each region is preferably proportional to a height of the one or more components aligned with each region.

Embodiments of the method may further include securing compressible thermal interface material to the first surface in alignment with the plurality of heat-generating components, wherein the thermal interface material has a thickness that extends from the first surface within each region into thermal engagement with the one or more components aligned with each region. In addition, the method may include selecting, for each region, a compressible thermal interface material having a thickness that is greater than variations in the height of the one or more components aligned with each region.

In a further embodiment of the method, the primary cold plate may be biased by two or more spring biased retainers that define an axial direction and guide the primary cold plate to move in the axial direction, wherein the two or more spring biased retainers limit the travel of the cold plate between first and second spaced distances from the circuit board, and wherein the processor has an installed height relative to the circuit board that is intermediate of the first and second spaced distances from the circuit board.

FIG. 1 is a schematic side view of a liquid cooling apparatus 10 aligned above a planar 20. The apparatus 10 includes a primary cold plate 30, a secondary cold plate 40, and two or more spring biased retainers 50 extending between the primary cold plate 30 and the secondary cold plate 40. The spring biased retainers 50 include compressible coil springs 52 that bias the primary cold plate 30 in a direction away from the second cold plate 40, but limit the distance that the primary cold plate can move away from the secondary cold plate. As shown, the spring biased retainers 50 include a post 54 that extends through the coil spring 52 and a hole in the primary cold plate 30, and a head 56 the retains the primary cold plate 30. However, the primary cold plate 30 may move toward the secondary cold plate 40 (upward, as shown in FIG. 1) under a force overcoming the two or more spring biased retainers 50. Accordingly, the spring biased retainers 50 moveably secure the primary cold plate 30 to the secondary cold plate 40. It should be recognized that the invention encompasses the use of alternative spring biased retainers, such as having the post secured to the primary cold plate and extending through the spring and a hole in the secondary cold plate, with a head at the end of the post.

The secondary cold plate 40 is shown in alignment with the circuit board 20 and is securable to the circuit board, such as using fasteners 12. For example, the fasteners 12 may be threaded fasteners (i.e., screws) that extend through a hole in the circuit board 20 and thread into the secondary cold plate 40. The secondary cold plate 40 has a first surface 42 aligned for thermal engagement with a plurality of heat-generating components 22 on a surface of the circuit board. The primary cold plate 30 is, by virtue of being secured to the secondary cold plate 40, aligned for thermal engagement with a processor 24 on the circuit board. For any given design of a circuit board, the placement and positioning of the primary and secondary cold plates 30, 40 has be determined to achieve the necessary alignments.

The primary cold plate 30 includes an internal liquid cooling channel 32, which allows liquid from an inlet conduit 34 to circulate through the primary cold plate 30 and then exits through an outlet conduit 36. Tubes supplying the liquid to the inlet conduit and draining the liquid from the outlet conduit are not shown. The liquid is preferably cool or chilled and is circulated at a controlled flow rate that is sufficient to maintain the processor at a safe operating temperature. In addition, the liquid should remove heat that passes to the primary cold plate 30 from the secondary cold plate 40.

To facilitate heat transfer from secondary cold plate 40 to the primary cold plate 30, the apparatus further comprises compressible thermal interface material 44 disposed between the primary cold plate and the secondary cold plate. The thermal interface material 44 is compressible to accommodate the potential range of movement of the primary cold plate 30 while still being able to conduct heat from the secondary cold plate to the primary cold plate. The primary cold plate 30 has surfaces 38 that are parallel to opposing surfaces 46 of the secondary cold plate 40. The opposing surfaces 38, 46 are shown at an angle relative to direction of movement of the primary cold plate 30, which increases the heat transfer area between the cold plates while still putting the thermal interface material 44 in compression when the primary cold plate 30 moves (upward as shown in FIG. 1). Additional pieces of thermal interface material (TIM) are secured to the cold plates in alignment with heat-generating components on the circuit board 20, such as TIM 48 secured to the secondary cold plate 40 in alignment with components 22 and TIM 39 secured to the primary cold plate 30 in alignment with the processor 24.

Figure 2:
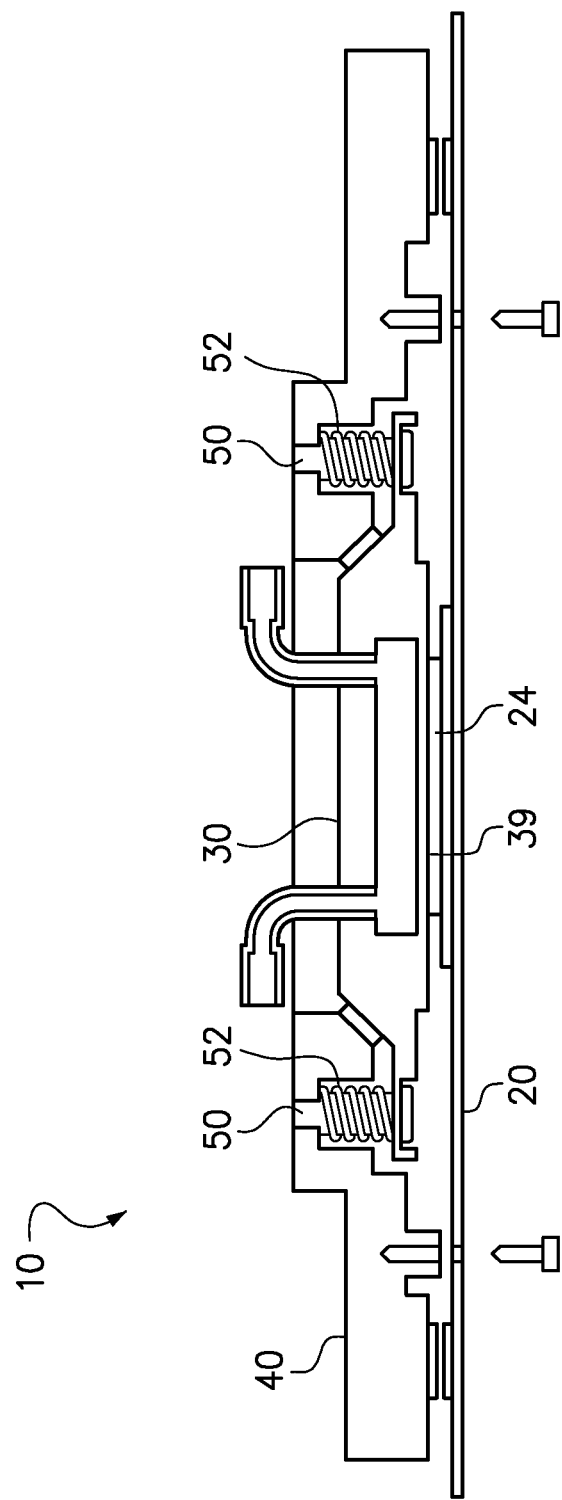
FIG. 2 is a schematic side view of the liquid cooling structure lowered toward the planar such that the cold plate has made contact with a processor on the planar.

FIG. 2 is a schematic side view of the liquid cooling structure 10 having been lowered toward the planar 20 such that the cold plate 30 has made contact with the processor 24 on the planar 20. Specifically, the TIM 39, which may be a thermal grease, is now pressed between the primary cold plate and the processor. The processor/cold plate bond line is typically the most critical element in a thermal cooling solution, since the processor generates the highest heat flux of any component on the circuit board. The typical bond lines for this interface may be very small, on the order of 5 mils (0.005 inches/127 microns). As the secondary cold plate 40 is lowered toward the circuit board 20, the primary cold plate 30 is pushed against the processor 24. The resistance force of the processor 24 eventually overcomes the forces in the springs 52 and causes the primary cold plate 30 to move as guided by the retainers 50 (upward, as shown in FIG. 2). At first, any difference in the angle of the top surface of the processor 24 and the opposing surface of the primary cold plate 30 may cause one spring 52 to compress more than the other until the two surfaces are parallel. This is referred to herein as "self-leveling."

Figure 3:
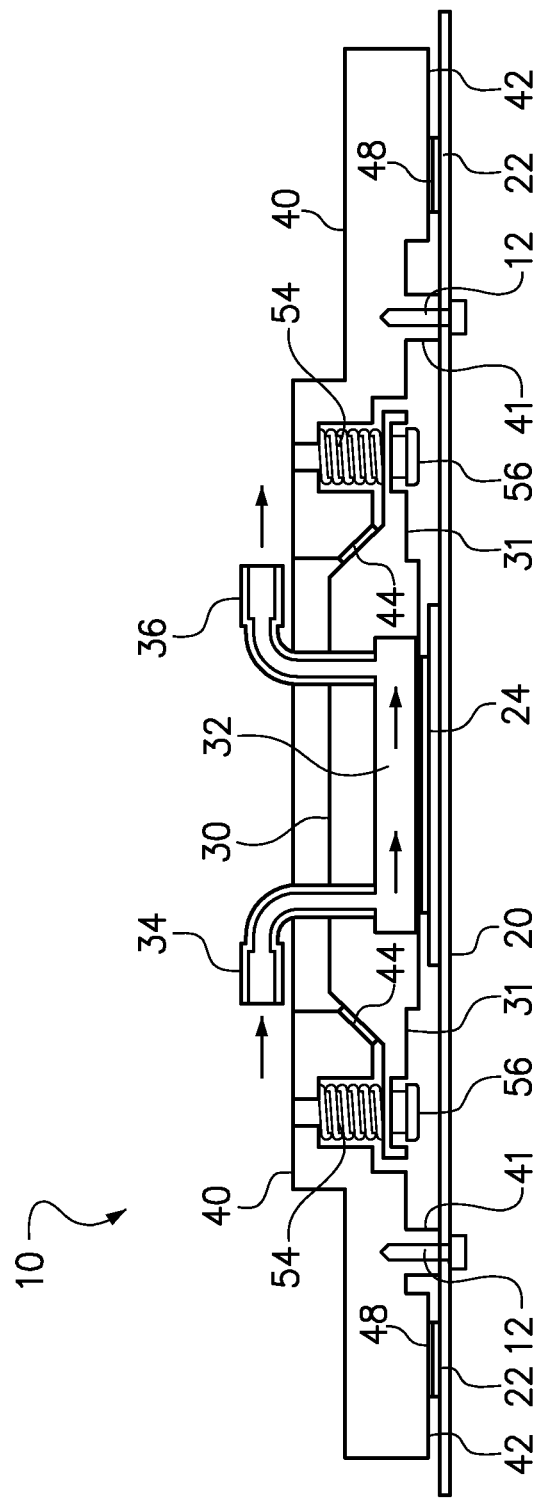
FIG. 3 is a schematic side view of the liquid cooling structure secured to the planar in its operable position for cooling multiple components on the planar.

FIG. 3 is a schematic side view of the liquid cooling apparatus 10 secured to the circuit board 20 in its operable position for cooling multiple components on the circuit board or planar. Two or more spacers 41 are received against the circuit board 20 to position the secondary cold plate 40 in a spaced apart relationship at a predetermined distance. In this embodiment, the spacers 41 are secured to, or integrally formed with, the secondary cold plate 40. In the position shown, the fasteners 12 have been extended through the circuit board 20 and threaded into the spacers 41, such that the secondary cold plate 40 is secured to the circuit board 20 and the surface 42 has a predetermined spaced distance from the circuit board 20. Accordingly, the TIM 48 has engaged the components 22 and has been compressed. The extent to which the TIM 48 has been compressed depends upon the actual installed height of the components 22, which may be known to experience a range of variation due to manufacturing and assembly variation. If the component is at the taller end of the height range for that component then the TIM will be substantially compressed, whereas if the component is at the shorter end of the height range for that component then the TIM will be only slightly compressed. Note that different types or models of components may have still different heights with their own range of height variation. Embodiments of the invention deal with different types or models of components in reference to FIG. 5, below.

In further reference to FIG. 3, the primary cold plate 30 has moved toward the secondary cold plate 40, further compressing the TIM 44. Notice that the primary cold plate 30 has flanges 31 with a hole there through for receiving the post 54, but not allowing the head 56 to pass through the hole. Still, the post 54 defines an axial direction and guides the primary cold plate 30 for movement along the axial direction.

As shown, the operable position of the apparatus 10 provides each heat-generating component 22 in thermal engagement with the secondary cold plate 40 and provides the processor 24 in thermal engagement with the primary cold plate 30. Furthermore, the TIM 44 maintains thermal engagement between the primary cold plate 30 and the secondary cold plate 40 so that heat from the secondary cold plate can be transferred to the primary cold plate to be withdrawn in the liquid. Accordingly, fluid is introduced through the inlet conduit 34, passed through the liquid cooling channel 32, and exits the outlet conduit 36 after having absorbed thermal energy from the body of the primary cold plate 30. The body of the primary and secondary cold plates may be made of aluminum alloys or other highly thermally conductive materials, such as copper.

Figure 4:
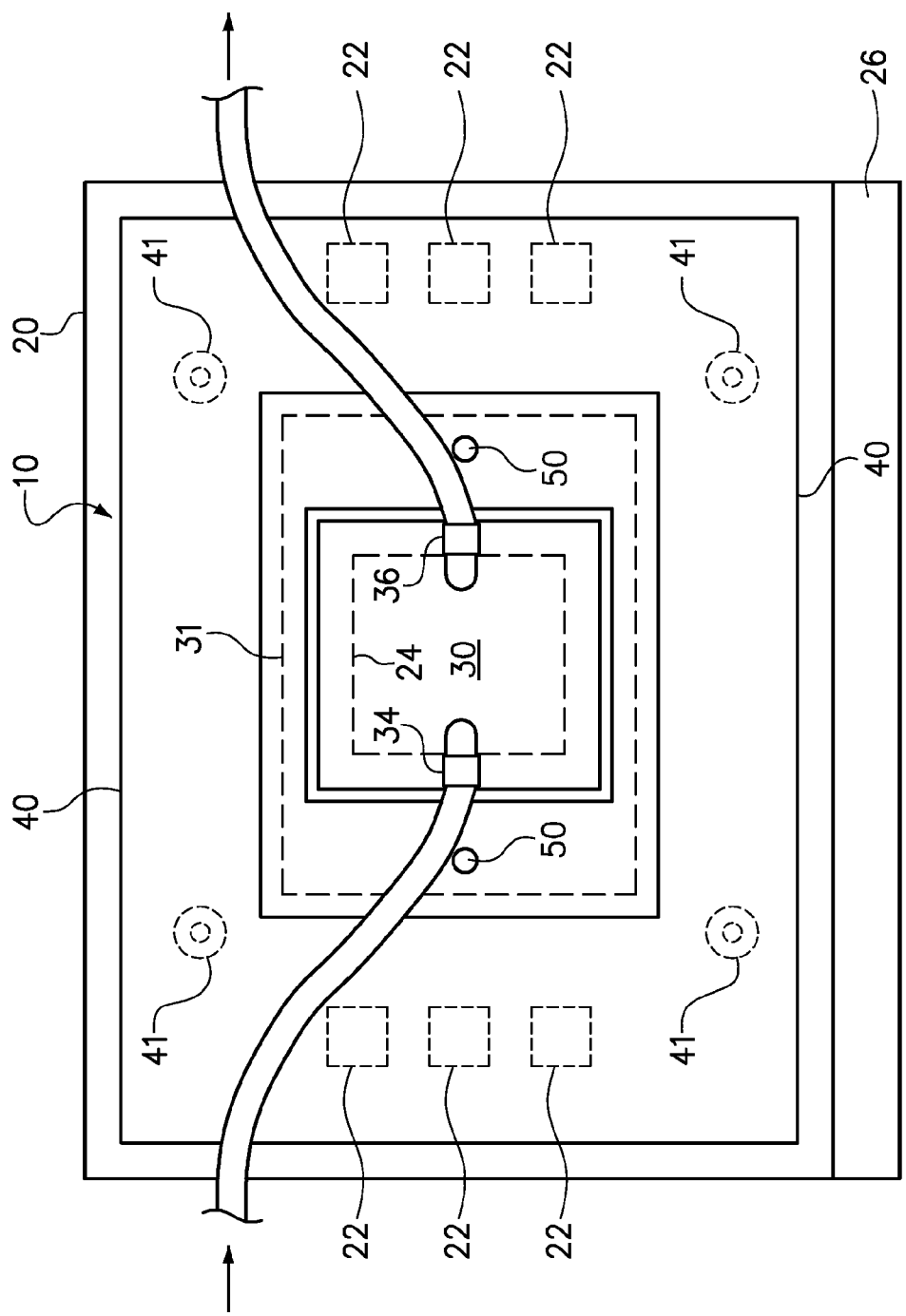
FIG. 4 is a top plan view of the liquid cooling structure secured to the planar.

FIG. 4 is a top plan view of the liquid cooling apparatus 10 secured to the circuit board 20. Consistent with FIG. 3, the secondary cold plate 40 is thermally engaged with the heat-generating components 22 on the circuit board, and the primary cold plate 30 is thermally engaged with the processor 24. The primary cold plate 30 includes flanges 31 that may extend around the perimeter of the primary cold plate. The position of two spring biased retainers 50 are shown on opposing sides of the primary cold plate 30, although more such retainers may be used. Furthermore, the secondary cold plate 40 is shown being secured to the circuit board with four spacers 41.

Figure 5:
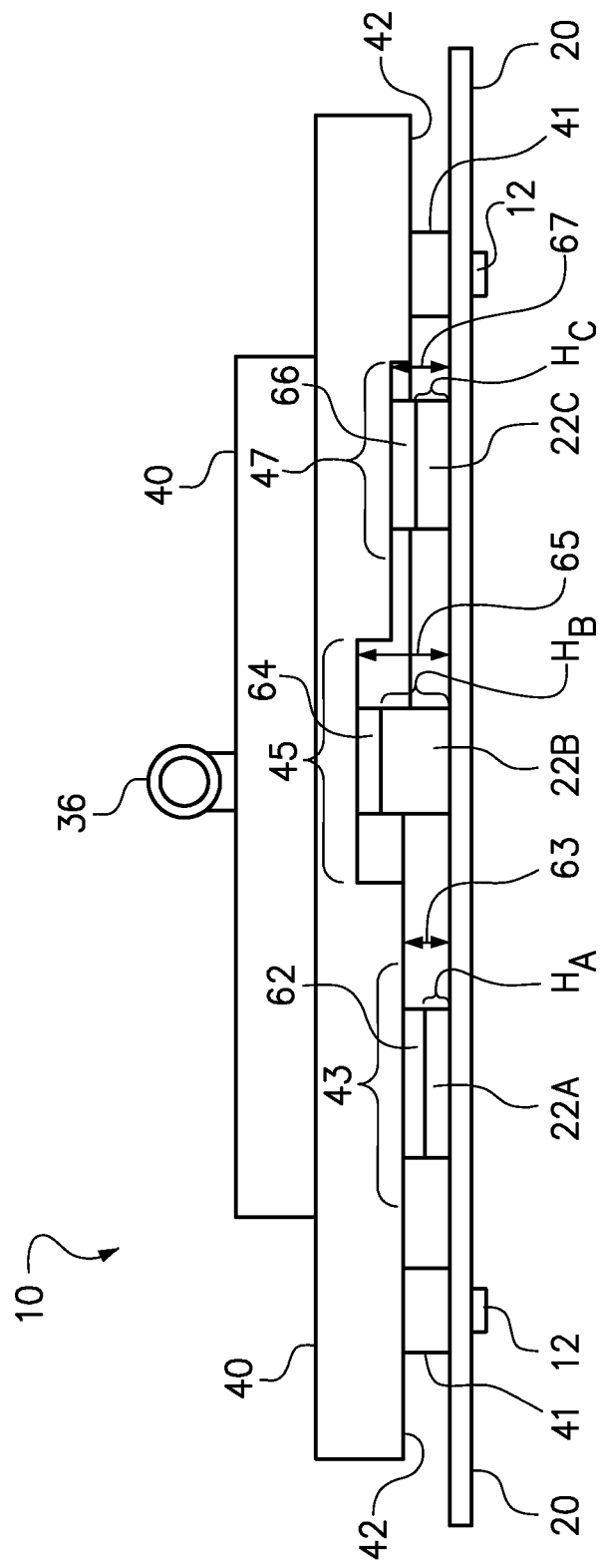
FIG. 5 is an end view of the liquid cooling structure having a multi-level profile for accommodating components having different heights relative to the planer.

FIG. 5 is an end view of the liquid cooling apparatus 10 having a multi-level profile for accommodating components 22A, 22B, 22C having different heights $H_A$, $H_B$, $H_C$ relative to the circuit board 20. Accordingly, the surface 42 facing the circuit board 20 is divided into regions 43, 45, 47 aligned with the components 22A, 22B, 22C having the different heights $H_A$, $H_B$, $H_C$, respectively. The different regions 43, 45, 47 are designed to have a spaced distance 63, 65, 67, respectively, that is proportional to the different heights $H_A$, $H_B$, $H_C$, of the components 22A, 22B, 22C aligned with each region. Although each of the components 22A, 22B, 22C may have a range of height variation, the different regions 43, 45, 47 are designed to have a spaced distance 63, 65, 67 that will accommodate even the tallest component in that range, and each region is provided with a thermal interface material (TIM) 62, 64, 66 that is thick enough to thermally engage even the shortest component in that range. As shown a single apparatus 10 has simultaneously provide thermal engagement with multiple components having different heights.

Figure 6:
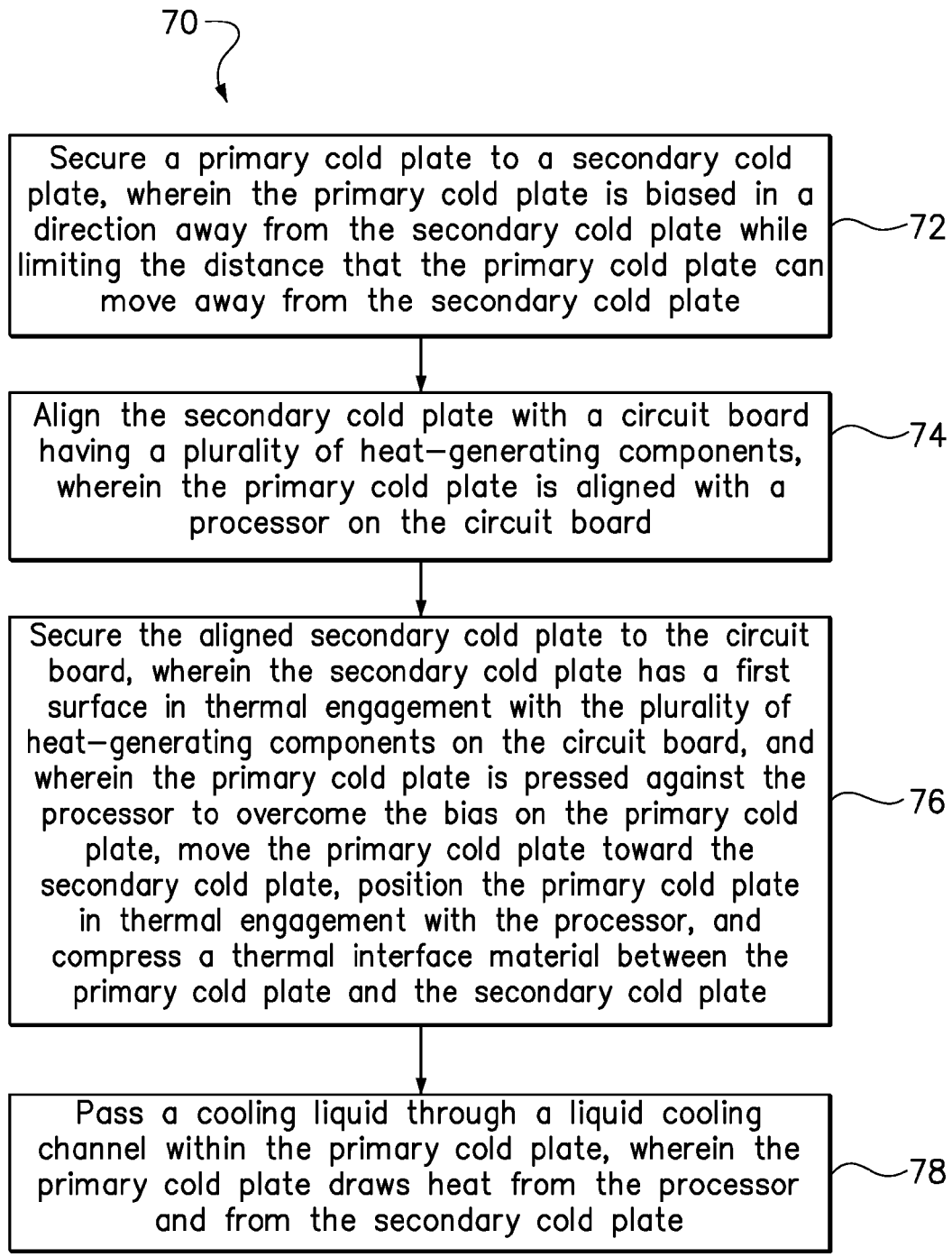
FIG. 6 is a flowchart of a method of cooling a planer.

FIG. 6 is a flowchart of a method 70 of cooling a circuit board. Step 72 secures a primary cold plate to a secondary cold plate, wherein the primary cold plate is biased in a direction away from the secondary cold plate while limiting the distance that the primary cold plate can move away from the secondary cold plate. In step 74, the secondary cold plate is aligned with a circuit board having a plurality of heat-generating components, wherein the primary cold plate is aligned with a processor on the circuit board. The aligned secondary cold plate is then secured to the circuit board in step 76, wherein the secondary cold plate has a first surface in thermal engagement with the plurality of heat-generating components on the circuit board, and wherein the primary cold plate is pressed against the processor to overcome the bias on the primary cold plate, move the primary cold plate toward the secondary cold plate, position the primary cold plate in thermal engagement with the processor, and compress a thermal interface material between the primary cold plate and the secondary cold plate. Then, in step 78, a cooling liquid is passed through a liquid cooling channel within the primary cold plate, wherein the primary cold plate draws heat from the processor and from the secondary cold plate.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the invention.

The corresponding structures, materials, acts, and equivalents of all means or steps plus function elements in the claims below are intended to include any structure, material, or act for performing the function in combination with other claimed elements as specifically claimed. The description of the present invention has been presented for purposes of illustration and description, but it is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. An apparatus, comprising:
   a secondary cold plate securable to a circuit board, wherein the secondary cold plate has a first surface aligned for thermal engagement with a plurality of heat-generating components on a surface of the circuit board;
   a plurality of spacers allowing the secondary cold plate to be secured to the circuit board with the first surface a predetermined spaced distance from the circuit board;
   a primary cold plate aligned for thermal engagement with a processor on the circuit board, wherein the primary cold plate includes an internal liquid cooling channel;
   two or more spring biased retainers extending between the primary cold plate and the secondary cold plate and moveably securing the primary cold plate to the secondary cold plate, wherein the two or more spring biased retainers bias the primary cold plate in a direction away from the secondary cold plate while limiting the distance that the primary cold plate can move away from the secondary cold plate, and wherein the primary cold plate moves toward the secondary cold plate under a force overcoming the two or more spring biased retainers, wherein the two or more spring biased retainers define an axial direction and guide the primary cold plate to move in the axial direction, wherein the primary cold plate and the secondary cold plate have parallel surfaces that compress the thermal interface material in response to the primary cold plate moving toward the secondary cold plate, wherein the parallel surfaces are angled between 30 and 60 degrees relative to the axial direction; and
   compressible thermal interface material disposed between the primary cold plate and the secondary cold plate for conducting heat from the secondary cold plate to the primary cold plate for removal in a liquid flowing through the liquid cooling channel, wherein the thermal interface material is compressed between the primary cold plate and the secondary cold plate in response to the primary cold plate moving toward the secondary cold plate.

2. The apparatus of claim 1, wherein the two or more spring biased retainers include a pre-loaded spring.

3. The apparatus of claim 1, wherein the plurality of heat-generating components include board-mounted memory.

4. The apparatus of claim 1, wherein the plurality of spacers are a feature of the secondary cold plate and extend from the first surface of the secondary cold plate.

5. The apparatus of claim 1, wherein the first surface of the secondary cold plate is divided into a plurality of regions, wherein each region is aligned with one or more of the plurality of heat-generating components and has a predetermined spaced distance from the circuit board for thermal engagement with the one or more heat-generating components aligned with each region, wherein the predetermined spaced distance of each region is proportional to a height of the one or more components aligned with each region.

6. The apparatus of claim 5, further comprising:
compressible thermal interface material secured to the first surface in alignment with the plurality of heat-generating components and having a thickness that extends from the first surface within each region into thermal engagement with the one or more components aligned with each region.

7. The apparatus of claim 6, wherein the thickness of the compressible thermal interface material in each region is greater than variations in the height of the one or more components aligned with each region.

8. The apparatus of claim 5, wherein the plurality of regions includes at least three regions having a different predetermined spaced distance from the circuit board for thermal engagement with the at least three components having different heights.

9. The apparatus of claim 1, wherein the two or more spring biased retainers define an axial direction and guide the primary cold plate to move in the axial direction, wherein the two or more spring biased retainers limit the travel of the cold plate between first and second spaced distances from the circuit board, and wherein the processor has an installed height relative to the circuit board that is intermediate of the first and second spaced distances from the circuit board.

10. The apparatus of claim 1, wherein the secondary cold plate is made from an aluminum alloy.

11. The apparatus of claim 1, further comprising:
thermal grease disposed on the primary cold plate for thermal engagement between the primary cold plate and the processor on the circuit board.

\* \* \* \* \*